United States Patent
Breault et al.

(10) Patent No.: US 10,637,080 B2
(45) Date of Patent: Apr. 28, 2020

(54) ACID RESISTANT, MONOLITHIC FUEL CELL COOLER ASSEMBLY

(75) Inventors: Richard D. Breault, North Kingstown, RI (US); Kishore Kumar Tenneti, Manchester, CT (US); Sridhar V. Kanuri, Milford, CT (US); Richard J. Rempe, West Hartford, CT (US)

(73) Assignee: DOOSAN FUEL CELL AMERICA, INC., South Windsor, CT (US)

(*) Notice: Subject to any disclaimer, the term of this patent is extended or adjusted under 35 U.S.C. 154(b) by 428 days.

(21) Appl. No.: 14/353,439

(22) PCT Filed: Oct. 25, 2011

(86) PCT No.: PCT/US2011/001806
§ 371 (c)(1),
(2), (4) Date: Apr. 22, 2014

(87) PCT Pub. No.: WO2013/062503
PCT Pub. Date: May 2, 2013

(65) Prior Publication Data
US 2014/0295300 A1    Oct. 2, 2014

(51) Int. Cl.
*H01M 8/04007* (2016.01)
*H01M 8/0258* (2016.01)
(Continued)

(52) U.S. Cl.
CPC ..... *H01M 8/04074* (2013.01); *H01M 8/0221* (2013.01); *H01M 8/0226* (2013.01); *H01M 8/0258* (2013.01)

(58) Field of Classification Search
CPC ........... H01M 8/04074; H01M 8/0221; H01M 8/0226; H01M 8/0258; H01M 8/0267
See application file for complete search history.

(56) References Cited

U.S. PATENT DOCUMENTS

| 4,478,918 A | * | 10/1984 | Ueno ............... H01M 8/04074 429/434 |
| 4,929,517 A | | 5/1990 | Luoma et al. |

(Continued)

FOREIGN PATENT DOCUMENTS

| JP | 63128562 A | * | 6/1988 | ........ H01M 8/04074 |
| JP | 2003077485 A | * | 3/2003 | |

(Continued)

OTHER PUBLICATIONS

Sandra Curtin—Different Types of Fuel Cells (Apr. 1, 2006) AltEnergyMag.*
(Continued)

*Primary Examiner* — Stewart A Fraser
(74) *Attorney, Agent, or Firm* — Carlson, Gaskey & Olds

(57) ABSTRACT

A composite plate (26) is formed in a mold (8) by placing one of two preforms (15, 23) of between about 80 wt. % and about 85 wt. % flake graphite, balance polymer binder, into the mold and disposing a coolant tube array (18) thereon, depositing a powder (21) of the flake/polymer around the tube array, placing a second preform on the powder and a mold plunger (27) on the second preform, heating the mold to the melting temperature of the polymer under a pressure of 625 psi (4311 kPa), cooling the mold to the solidification temperature of the polymer while still under pressure, cooling the mold further, disassembling the mold, and removing the composite plate. The composite plate has reactant gas flow field channels (31, 32) in major surfaces thereof, is devoid of any acid edge protection layer or film and is devoid of any acid impervious separator plate between either of the fuel cell reactant gas flow fields and the coolant tube array.

7 Claims, 2 Drawing Sheets

(51) Int. Cl.
*H01M 8/0226* (2016.01)
*H01M 8/0221* (2016.01)

(56) References Cited

U.S. PATENT DOCUMENTS

| | | | |
|---|---|---|---|
| 5,558,955 A | | 9/1996 | Breault et al. |
| 6,050,331 A | * | 4/2000 | Breault .................. F28F 21/02 165/168 |
| 2011/0177419 A1 | * | 7/2011 | Luoma ................ H01M 8/0213 429/457 |

FOREIGN PATENT DOCUMENTS

| | | |
|---|---|---|
| JP | 2006156173 A | 6/2006 |
| WO | 2010123478 A1 | 10/2010 |
| WO | 2010123479 A1 | 10/2010 |

OTHER PUBLICATIONS

JP 2003-077485—Fuel cell searator and its manufacturing method (AIPN translation).*
English machine translation of Seki (JP 63128562 A) provided herein (Year: 1998).*
International Search Report and Written Opinion for International Application No. PCT/US2011/001806 dated May 25, 2012.

* cited by examiner

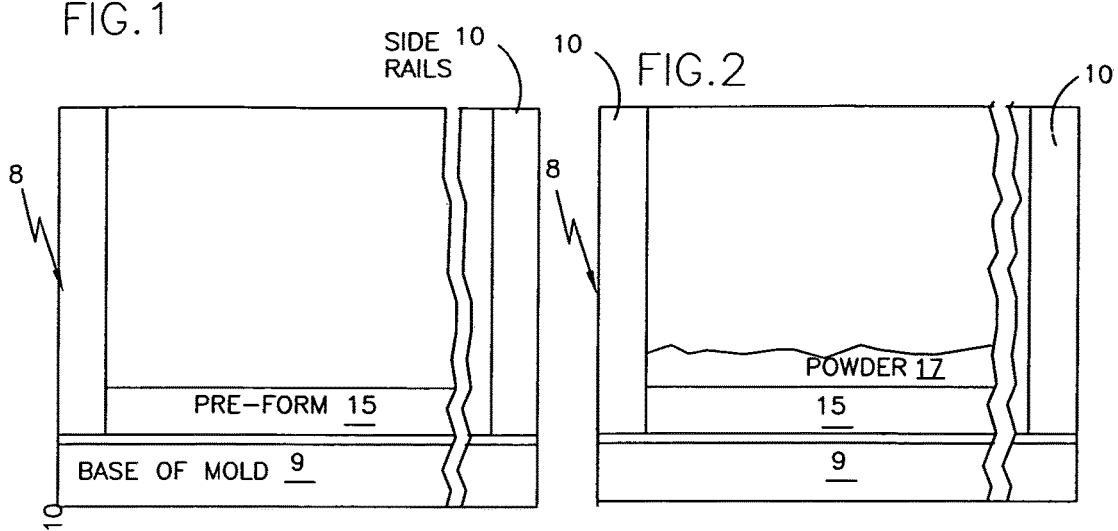
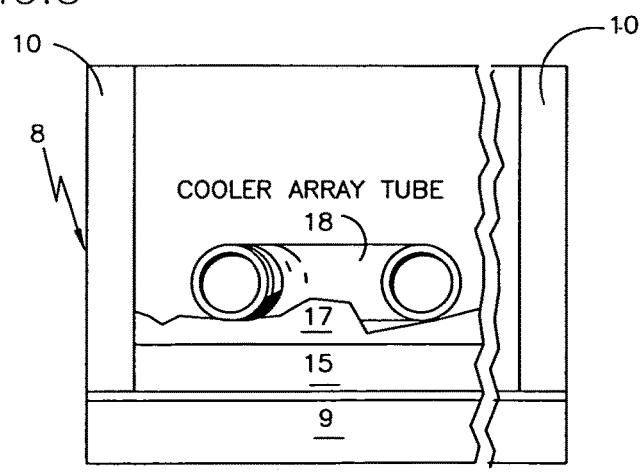
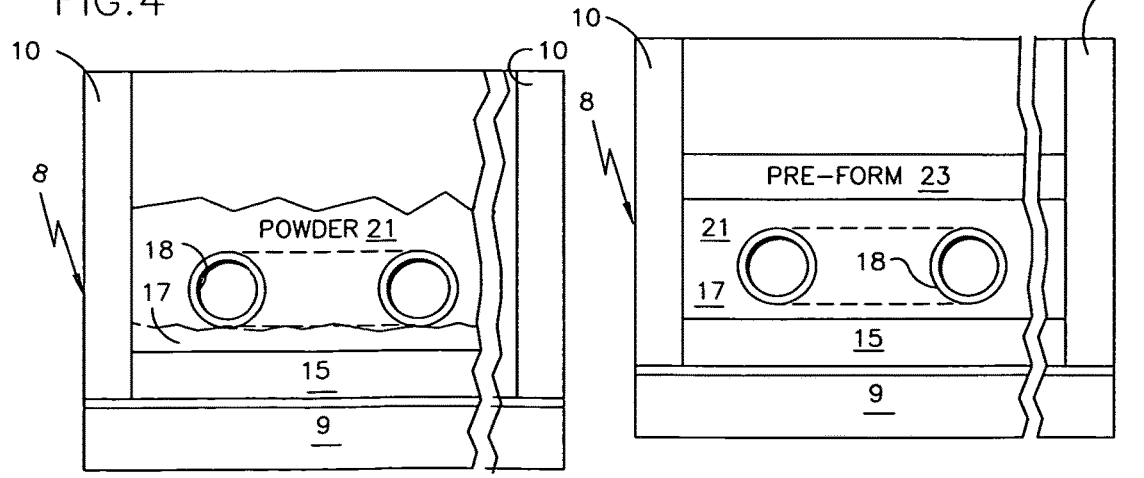

ACID RESISTANT, MONOLITHIC FUEL CELL COOLER ASSEMBLY

TECHNICAL FIELD

A monolithic fuel cell cooler assembly with reactant flow fields integrated therein has a single consistent composition throughout which resists acid absorption sufficiently to render acid impermeable graphite or carbon separator plate and edge layers unnecessary, and permits integration of reactant gas flow fields with the cooler plate.

BACKGROUND ART

In low temperature stationary fuel cell power plants, acid electrolytes are quite common. One factor that has to be accommodated is the migration of acid from one fuel cell into the next. This has resulted in the use of acid-impermeable graphite or carbon separator plates disposed at opposite surfaces of cooler plates, or centrally within integral separator plate assemblies. In addition, cooler plates used in acid electrolyte fuel cells have had acid-impermeable edge protection layers on both edges of the cooler array, in order to avoid corrosion of the metallic coolant tube material.

In order to bond metal coolant tubes with components in typical contemporary cooler plates, the exterior surface of the coolant tubes have been roughened by flame spraying, sand blasting or otherwise. Roughening of the surface is expensive. In order to protect the coolant plate, and particularly the coolant tube, from corrosion by the acid electrolyte, contemporary cooler plates have required acid edge protection layers or films, which may have taken the form of a tape of fluorinated ethylene propylene polymer or polytetrafluoroethylene, with an adhesive layer which joins the tape to the edge of the plate; this is also expensive.

Exemplary prior systems are disclosed in U.S. Pat. Nos. 4,929,517, 5,558,955 and 6,050,331, and in patent publication US 2011-017749, all incorporated herein by reference.

Contemporary cooler plates which are disposed between flow field plates are typically not bonded or adhered to the adjacent flow field plates. While it is desirable in liquid electrolyte fuel cells to have the electrode substrates be porous and hydrophilic, so that they can act as electrolyte storage volumes, the electrolyte penetration thereof requires that there be liquid impermeable separator plates between the electrode substrates and the cooler plate to prevent coolant tube corrosion. Typically, the acid impervious graphite or carbon separator plates are bonded to the cooler plates.

The contemporary cooler plates and associated flow field plates for liquid electrolyte fuel cells are therefore composed of many parts requiring many procedural steps for their manufacture. This is not only expensive, but it also increases the bulk of each section of the fuel cell stack.

SUMMARY

A composite cooler and reactant flow field plate for liquid electrolyte fuel cells in accordance with the modality herein includes a uniform composition of flake graphite and polymer binder. Because the cooler plate is formulated with a consistent monolithic composition comprising between about 80 wt. % and about 85 wt. % flake graphite, balance polymer binder, the cooler plate does not require, and therefore is devoid of any acid-resisting edge protection layers or separator plate layers. Reactant flow fields for adjacent fuel cells are integral with the cooler plate, being formed in portions of the cooler plate which consist of very dense flaked graphite and hydrophobic thermoplastic polymer; the cooler plate according to the present modality is therefore devoid of acid-resisting graphite or carbon separator plates or layers adjacent to the reactant flow fields.

A method of forming the composite plate includes depositing a first volume of the aforementioned flake graphite and polymer binder composition, which may or may not include a dense, compacted preform, in the bottom of a mold, placing a coolant tube array on said first volume, depositing a powder of the aforementioned composition around and above the coolant tube array, depositing a second volume of said composition, which may or may not include a dense compacted preform, above said powder, placing a mold plunger on top of said second volume, heating the mold content above the melting temperature of the polymer at a pressure of about 625 psi (431 kPa) for about 5 or more minutes, cooling the mold content to at least the solidification temperature of the polymer while still under said pressure, further cooling the mold content, disassembling the mold and removing the formed composite plate.

Other variations will become more apparent in the light of the following detailed description of exemplary embodiments, as illustrated in the accompanying drawings.

BRIEF DESCRIPTION OF THE DRAWINGS

FIG. 1 is a simplified front sectional view, with sectioning lines omitted for clarity, of a mold having a pre-form loaded therein.

FIG. 2 is a view of the mold of FIG. 1 having a powdered mixture of flaked graphite and polymer binder loaded on top of the preform.

FIG. 3 is a view of the mold of FIG. 1 having a cooler tube array loaded on top of the powdered mixture.

FIG. 4 is a view of the mold of FIG. 2 having a sufficient volume of a powdered mixture of flaked graphite and polymer binder, loaded around and above the coolant tube array.

FIG. 5 is a view of the mold of FIG. 3 having a preform loaded on top of the graphite/polymer powdered mixture.

MODE(S) OF IMPLEMENTATION

Figure 6:
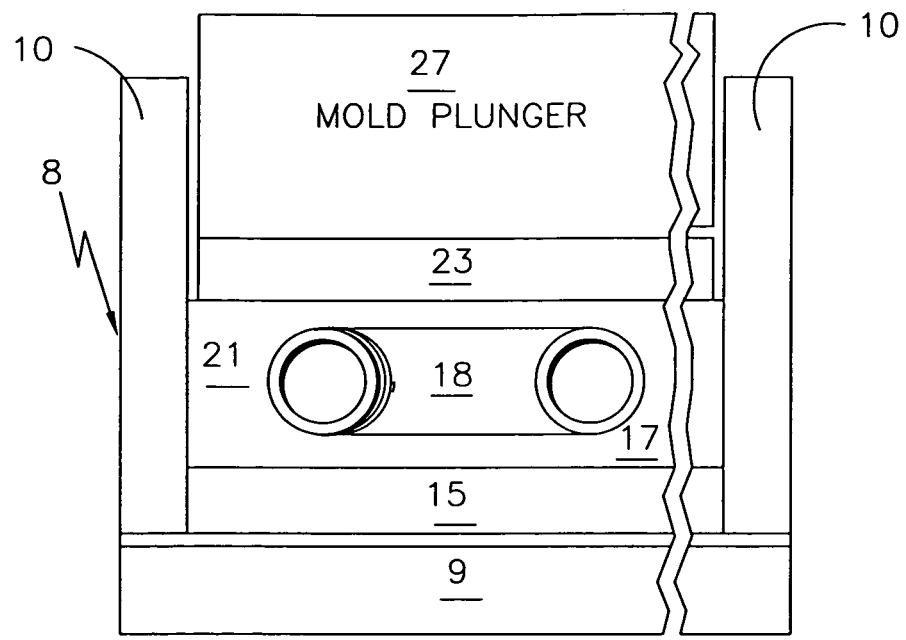
FIG. 6 is a view of the mold of FIG. 4 with the mold plunger disposed therein, during molding of the composite cooler plate.

Referring to FIG. 1, a mold 8 has a base 9, a pair of side rails 10, and front and back portions, only the back portion 11 being shown. In FIG. 1, a first volume has been filled by a preform 15 which has been added to the mold. The preform comprises a mixture of between about 80 wt. % and about 85 wt. % flake graphite, which might preferably be thermally purified, natural graphite flakes, balance hydrophobic thermoplastic polymer binder which may preferably be fluorinated ethylene-propylene, which is available from DuPont under the tradename FEP TEFLON®, or perfluoroalkoxy, which is available from DuPont under the tradename PFA TEFLON®, or polytetrafluorethene (PTFE) available from DuPont, or mixtures thereof. For an exemplary cooler assembly in accordance herewith that is 508 mm (20.0 in) by 508 mm by 17 mm (0.67 in), the preform 15 is made by compacting approximately 3,000 grams (6.6 lbs) of the flaked graphite and polymer mixture at about 4,000 psi (27,600 kPa).

Referring to FIG. 2, on top of the preform 15, a layer 17 of powdered mixture of flake graphite and polymer binder is spread above the preform 17. In FIG. 3, a cooler array tube 18 is placed over the powder 17. Typically, the cooler array may have a serpentine configuration having on the order of 14 segments. The tube may be made of a suitable metal, such as stainless steel, which can withstand the operation of a fuel cell coolant system and the cooler fabrication process. In the exemplary cooler plate, the coolant tube may have an outside diameter of about 6.4 mm (0.25 in).

In FIG. 4, a suitable volume of powder, comprising the aforementioned mixture of flake graphite and polymer binder, is spread between and above the cooler array tube 18. For the size cooler plate referred to hereinbefore, about 3800 grams (8.4 lbs) of powder may be used.

Figure 7:
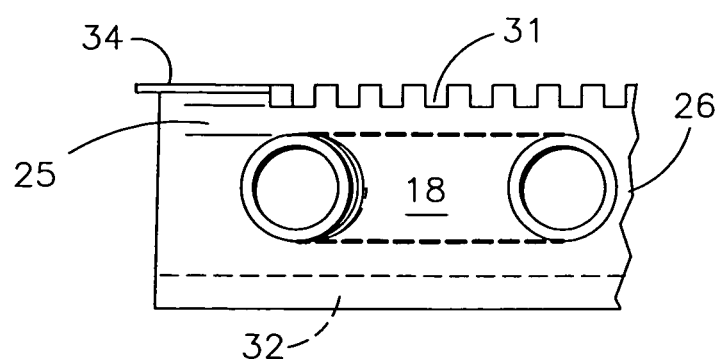
FIG. 7 is a partial front sectional view, with sectioning lines omitted for clarity, of a composite, monolithic cooler plate, including cooler tubes and reactant flow fields, with flaps for preventing migration of liquid electrolyte between fuel cells, in accordance with the present modality.

In FIG. 5, a second volume has been filled by a preform 23, identical to the preform 15, which is placed on top of the powder 21. The preforms should be nearly the same thickness to ensure that the tube is centered near the middle of the cooler plate assembly. The thickness of the preforms 15, 23 and the amount of powder 17, 21 should be enough to ensure that there is sufficient graphite-FEP web around the coolant tube to provide a reliable barrier to acid penetration to prevent corrosion of the metallic tube. The "web" 25, FIG. 7, is defined as the distance between the greatest depth of the reactant flow fields and outer diameter of the coolant tube. The web thickness must be sufficient to ensure that acid does not penetrate to the cooler tube over the life of the fuel cell system. In the exemplary system referred to hereinbefore, the web should be not less than about 1.4 mm (0.06 in) for long-term reliability.

Instead of compacted preforms, the aforementioned mixture may be used in powdered form at the bottom of the mold and in all the volume above the coolant tube.

In FIG. 6, the composite cooler plate assembly 26 is formed by having the mold plunger 27 apply about 625 psi (4311 kPa) of pressure while the material in the mold is heated above the melting temperature of the polymer, about 650 F (343 C), for FEP TEFLON®. After a short period of time, about 5 minutes, the contents of the mold is allowed to cool below the solidifying temperature of the thermoplastic polymer, such as about 400 F (204 C) for FEP TEFLON® while maintaining the pressure of about 625 psi. Then the mold is cooled further, the mold is disassembled, and the composite cooler plate assembly 26 is removed.

During the molding process, the preform density increases from about 1.8 gm/ml (about 1.03 oz/cu in) to about 2.1 gm/ml (about 1.2 oz/cu in). The melting of the polymer, and its bonding with the flake graphite under pressure, causes the highly hydrophobic nature of the composite plate, which provides superior resistance to acid penetration.

FIG. 7 illustrates a fraction of the composite cooler plate assembly 26 after reactant flow field channels 31, 32 have been machined therein. The air flow field channels may be about 0.7 mm (0.03 in) deep; the fuel channels about 1.0 mm (0.04 in) deep, and both channels about 1.6 mm (0.6 in) wide. A flap 34 has been adhered to a land, machined into the surface of the composite cooler plate assembly 26 adjacent to the reactant flow field channels 31. A similar flap (not shown) is placed adjacent the reactant flow field channels 32. Details of the flap are as disclosed in PCT Patent Publication WO 2010/123479 A1, incorporated herein by reference. The flap blocks the flow of acid film which in turn prevents acid from flowing from positive to negative ends of cell substacks along the edge of the cooler, which ultimately results in acid pumping from the negative end of a group of cells to the positive end thereof.

Instead of being machined upon completion of the composite cooler plate, the reactant gas flow field channels 31, 32 may be molded into the preforms 15, 23 as the composite plate is formed in FIG. 6. This would require ribs on the mold base 9 and on the plunger 27. Release materials and other accommodations may be employed in such case.

The modality herein is applicable to liquid electrolyte fuel cells, particularly acid electrolyte fuel cells. Phosphoric acid is currently in common use, but the modality herein is applicable to other acid electrolytes, such as fluoroborate acid, which systems would operate at pressures and temperatures similar to those of phosphoric acid systems.

Since changes and variations of the disclosed embodiments may be made without departing from the concept's intent, it is not intended to limit the disclosure other than as required by the appended claims.

The invention claimed is:

1. A composite fuel cell plate assembly comprising:
a plate body having oppositely facing surfaces and oppositely facing edges, wherein the oppositely facing edges have a dimension corresponding to a thickness of the plate body between the oppositely facing surfaces, the plate body being formed of a material comprising a mixture of between about 80 wt. % and about 85 wt. % flake graphite and a remainder of polymer binder, the material defining an entirety of the plate body between the oppositely facing surfaces and the oppositely facing edges, the plate body including flow field channels on the oppositely facing surfaces of the plate body; and
a coolant tube array embedded within the plate body between the flow field channels of one of the oppositely facing surfaces and the flow field channels of the other of the oppositely facing surfaces, the coolant tube array comprising at least one metal tube including a plurality of segments defining a plurality of passes for a coolant fluid within the plate body;
wherein the plate body includes a web of the material between the coolant tube array and a deepest surface of the flow field channels on a corresponding one of the oppositely facing surfaces, the web being for preventing liquid acid electrolyte penetration through the material of the plate body to the cooler tube array for preventing contact between liquid acid electrolyte and the at least one metal tube, the web having a thickness that is at least 1.4 mm (0.06 in).

2. The composite fuel cell plate of claim 1, wherein the at least one metal tube has a serpentine configuration.

3. The composite fuel cell plate of claim 1, wherein the at least one metal tube comprises stainless steel.

4. The composite fuel cell plate of claim 1, comprising an acid flow prevention flap secured to the plate body along at least one of the oppositely facing surfaces and extending beyond an adjacent one of the oppositely facing edges of the plate body.

5. The composite fuel cell plate of claim 4, wherein the plate body includes a land along the one of the oppositely facing surfaces; and
a portion of the acid flow prevention flap is received in the land.

6. The composite fuel cell plate of claim 1, wherein the polymer binder comprises a hydrophobic polymer binder including at least one of fluorinated ethylene-propylene, perfluoroalkoxy, and polytetrafluorethene.

7. The composite fuel cell plate of claim 1, wherein the material is uniformly consistent throughout the entirety of the plate body.

* * * * *